United States Patent [19]

Bonnaterre

[11] 4,125,688
[45] Nov. 14, 1978

[54] NEGATIVE ELECTRODES FOR ELECTRIC CELLS

[75] Inventor: Raymond Bonnaterre, Bordeaux, France

[73] Assignee: Saft-Societe des Accumulateurs Fixes et de Traction, Romainville, France

[21] Appl. No.: 806,352

[22] Filed: Jun. 14, 1977

[30] Foreign Application Priority Data

Jun. 24, 1976 [FR] France ................................ 76 19224

[51] Int. Cl.² ...................... H01M 4/24; H01M 10/30
[52] U.S. Cl. .................................... 429/206; 429/218; 429/223
[58] Field of Search ............... 429/218, 223, 206, 217, 429/40, 42

[56] References Cited

U.S. PATENT DOCUMENTS

| | | |
|---|---|---|
| 3,698,953 | 10/1972 | Eisenberg ............................ 429/218 |
| 3,850,694 | 11/1974 | Dunlop et al. .................... 429/27 X |
| 3,874,928 | 4/1975 | Will .................... 429/206 X |
| 3,980,501 | 9/1976 | Feder ...................... 429/60 |
| 4,004,943 | 1/1977 | Boter ...................... 429/59 |

Primary Examiner—Anthony Skapars
Attorney, Agent, or Firm—Kenyon & Kenyon, Reilly, Carr & Chapin

[57] ABSTRACT

The invention relates to a negative electrode for an alkaline electrolyte electric cell. The main electrode material is nickel lanthanide and is characterized by the fact that it also includes a mercury compound. It is applicable to secondary electric cells, in particular of the nickel- or silver-hydrogen type. Cells embodying such negative electrodes exhibit improved capacity irrespective of temperature and electrolyte concentration conditions as compared with like cells in which the mercury compound is not used with the nickel lanthanide.

4 Claims, No Drawings

NEGATIVE ELECTRODES FOR ELECTRIC CELLS

RELATED APPLICATIONS

No related applications of applicant are copending.

BACKGROUND AND BRIEF SUMMARY OF INVENTION

The present invention relates to electrodes whose main material is lanthanum and nickel alloys, which can be called nickel lanthanide, and to their use. It is known that nickel lanthanides whose composition is close to the formula La Ni$_5$ fix hydrogen, forming hydrides which can then give up their hydrogen by a reversible reaction.

It has been proposed to use these nickel lanthanides in alkaline secondary cells of the nickel or silver-hydrogen type for example, in order to lower the hydrogen pressure during operation. It has been observed that electrodes which are cathodically polarized and hence charged, to several times their theoretical capacity (counting six or seven atoms of hydrogen for the formula La Ni$_5$), yielded a capacity of about 92% of the theoretical capacity at 0° C. and in concentrated electrolyte (12M potassium hydroxide); but it has been observed that this efficiency fell to 83% at ambient temperature and became only 50 to 60% in 5M potassium hydroxide.

Preferred embodiments of the present invention are intended to improve the capacity of such electrodes whatever the temperature and electrolyte concentration conditions.

The present invention provides an electrode whose main material is nickel lanthanide for use in an alkaline electrolyte, to which material a mercury compound is added.

Preferably, the compound is mercury oxide HgO and the weight of HgO added to the lanthanide is equal aproximately to 2% of the weight of the lanthanide.

The invention will be better understood by referring to the following detailed descriptive example of the electrode embodying the invention and its use.

DETAILED DESCRIPTION

An electrode was made from a powder contained from an alloy having a composition close to La Ni$_5$ by subjecting the alloy to several successive hydrogenation cycles. The resultant powder was then mixed at a temperature of approximately 60° C. with 2% by weight of polytetrafluoroethylene. A first series of perforated sheet metal pockets was filled with this material to be used as comparison electrodes of the prior art (about 1g of La Ni$_5$ per squ. cm. of pocket).

Mercury oxide HgO was then added in a proportion of 2% of the weight of La Ni$_5$ to what remained of the above described polytetrafluoroethylene-bound mass of La Ni$_5$, and a second series of like-dimensioned perforated sheet metal pockets was filled in the same way as for the first series. This second series of HgO containing La Ni$_5$ filled pockets comprise electrodes embodying the present invention.

The two series of electrodes were then tested respectively in cells where they were opposed respectively to a nickel counter-electrode immersed in aqueous solutions of potassium hydroxide. Two potassium hydroxide concentrations were used for respective different cells of each series, namely 5M and 12M. The potential of the pockets was referenced in relation to an Hg/HgO reference electrode.

All these first and second series electrodes were successively charged (i.e., negatively polarized in relation to the nickel counter-electrode) for 15 hrs. at C/5 A (C being the theoretical capacity of an electrode in Ah on the basis of 300 Ah/Kg), and then discharged (i.e., positively polarized in relation to the nickel counter-electrode) at C/5 A.

The results obtained are gathered in the table herebelow, giving the ratio of the discharged capacity to the theoretical capacity of 300 Ah/Kg.

| Electrolyte Concentration KOH | Temperature C. | Efficiency % | |
|---|---|---|---|
| | | First series (Prior Art) | Second series (Embodying the invention) |
| 5M | 21° C | 53.4% | 79.1% |
| 12M | 21° C | 82.5% | 92.3% |
| 5M | 0° C | 91.3% | 100.7% |

The 12M potassium hydroxide concentration is too high for yielding results at 0° C. that are of any value, the solution then being near to saturation.

These tabular results clearly indicate the material advantages obtained with the electrodes embodying the invention. Indeed, it is seen that at ambient temperature, e.g., 21° C., the efficiency of the electrodes according to the invention used with a diluted alkaline electrolyte 5M is practically as good or even better than the efficiency of the electrodes (first series) of the prior art in a concentrated electrolyte also at 21° C.

In all the conditions tested the efficiency of the electrodes embodying the invention was materially higher than that of the electrodes of the prior art under the same conditions of temperature and electrolyte concentration.

It must be understood that the invention is not limited to the embodiment which has just been described. Variations within the scope of the appended claims are possible and are contemplated. There is no intention of limitation to the exact disclosure herein presented.

What is claimed is:

1. An electrode for use in an alkaline electrolyte, the main material of the electrode being nickel lanthanide, wherein the improvement comprises said electrode containing in addition a mercury compound, said mercury compound added to said nickel lanthanide being mercury oxide, HgO.

2. An electrode according to claim 1, wherein the weight of HgO added to said lanthanide is equal to approximately 2% of the weight of said lanthanide.

3. An alkaline secondary cell including an alkaline electrolyte, a positive electrode, and a negative electrode comprising nickel lanthanide, wherein the improvement comprises said negative electrode having a mercury compound additive, said mercury compound being mercury oxide, HgO.

4. An alkaline secondary cell according to claim 3 wherein said mercury compound in said negative electrode is HgO in the proportion of approximately 2% of the weight of said nickel lanthanide in said negative electrode.